US012075310B2

(12) United States Patent
Cheng et al.

(10) Patent No.: US 12,075,310 B2
(45) Date of Patent: Aug. 27, 2024

(54) INTERNET-OF-THINGS SENSOR NETWORK FOR RECOMMENDATIONS BASED ON INTERNET-OF-THINGS SENSOR DATA AND METHODS OF USE THEREOF

(71) Applicant: Capital One Services, LLC, McLean, VA (US)

(72) Inventors: Lin Ni Lisa Cheng, New York, NY (US); Xiaoguang Zhu, Great Neck, NY (US); Vyjayanthi Vadrevu, Pflugerville, TX (US)

(73) Assignee: Capital One Services, LLC, McLean, VA (US)

( * ) Notice: Subject to any disclaimer, the term of this patent is extended or adjusted under 35 U.S.C. 154(b) by 310 days.

(21) Appl. No.: 17/685,734

(22) Filed: Mar. 3, 2022

(65) Prior Publication Data
US 2023/0283987 A1 Sep. 7, 2023

(51) Int. Cl.
H04W 4/02 (2018.01)
H04W 4/029 (2018.01)
H04W 4/21 (2018.01)

(52) U.S. Cl.
CPC ........... H04W 4/025 (2013.01); H04W 4/029 (2018.02); H04W 4/21 (2018.02)

(58) Field of Classification Search
CPC ...... H04L 67/12; H04L 67/306; H04W 4/023; H04W 4/024; H04W 4/025; H04W 4/029; H04W 4/21
See application file for complete search history.

(56) References Cited

U.S. PATENT DOCUMENTS 9,992,630 B2    6/2018  Turner et al.
10,045,150 B2   8/2018  Zakaria
2015/0327061 A1 11/2015 Haddad et al.

Primary Examiner — Nader Bolourchi
(74) Attorney, Agent, or Firm — GREENBERG TRAURIG, LLP

(57) ABSTRACT

Systems and methods of the present disclosure enable IoT-based social networking to detect, using IoT devices at a location, device signals associated with a first user device of a first user. A first user profile associated with the first user device is determined in response to the device signals. User attributes stored in the first user profile are accessed and extracted. A trained profile similarity model is used to determine similarity measures between the first user profile and other user profiles based on the user attributes. At least one similar user profile to the first user profile is identified based on the similarity measures. A meet-up point occupancy of each meet-up point at the location is determined based on a record of meet-up points to identify an open meet-up point. A meet-up recommendation is generated indicating the open meet-up point and the other user profiles.

20 Claims, 7 Drawing Sheets

INTERNET-OF-THINGS SENSOR NETWORK FOR RECOMMENDATIONS BASED ON INTERNET-OF-THINGS SENSOR DATA AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based platforms and/or systems for internet-of-things (IoT) sensor network for recommendations based on IoT sensor data and methods of use thereof, including user meet-up recommendations based on proximity and user attributes.

BACKGROUND OF TECHNOLOGY

Typically, social networking of users online and in-person is performed by the users finding each other's profile and agreeing to connect. Meeting, whether online or in person, is often performed by agreeing to meeting and deciding on a place and time.

SUMMARY OF DESCRIBED SUBJECT MATTER

Embodiments of the present disclosure include a method for social networking recommendations based on Internet-of-Things sensor data. The method comprises: detecting, by at least one processor for at least one Internet-of-Things (IoT) device associated with a particular location, a device signal associated with a user device of a user; determining, by the at least one processor, a user profile associated with the user device in response to the device signal; accessing, by the at least one processor, at least one user attribute stored in the user profile; determining, by the at least one processor, at least one other user profile associated with at least one other user device detected by the at least one IoT device associated with the particular location; extracting, by the at least one processor, at least one other user attribute stored in each other user profile of the at least one other user profile; utilizing, by the at least one processor, a trained profile similarity machine learning model to determine a similarity measure between the user profile and the at least one other user profile based at least in part on: the at least one other user attribute stored in each other user profile of the at least one other user profile, and the at least one user attribute stored in the user profile; determining, by the at least one processor, at least one similar other user profile of the at least one other user profile based at least in part on the similarity measure; determining, by the at least one processor, a meet-up point occupancy of each meet-up point at the particular location based at least in part on a record of the at least one meet-up point; determining, by the at least one processor, at least one open meet-up point based at least in part on the meet-up point occupancy; and generating, by the at least one processor, a meet-up recommendation indicating: a particular open meet-up point of the at least one open meet-up point, the user profile, and the at least one similar other user profile; and instructing, by the at least one processor, the user device of the user and the at least one other user device of at least one similar other user to display a graphical user-interface element presenting the meet-up recommendation so as to configure the user device and the at least one other user device to be direction aids when the user selects to a meet-up at the particular open meet-up point with the at least one similar other user.

Embodiments of the present disclosure include a system for social networking recommendations based on Internet-of-Things sensor data. The system comprises: at least one Internet-of-Things (IoT) device associated with a particular location; at least one processor in communication with the at least one IoT device, where the at least one processor is configured to execute software instructions that cause the least one processor to perform steps to: detect, using the at least one IoT device, a device signal associated with a user device of a user; determine a user profile associated with the user device in response to the device signal; access at least one user attribute stored in the user profile; determine at least one other user profile associated with at least one user device detected by the at least one IoT device associated with the particular location; extract at least one other user attribute stored in each other user profile of the at least one other user profile; utilize a trained profile similarity machine learning model to determine a similarity measure between the user profile and the at least one other user profile based at least in part on: the at least one other user attribute stored in each other user profile of the at least one other user profile, and the at least one user attribute stored in the user profile; determine at least one similar other user profile of the at least one other user profile based at least in part on the similarity measure; determine a meet-up point occupancy of each meet-up point at the particular location based at least in part on a record of the at least one meet-up point; determine at least one open meet-up point based at least in part on the meet-up point occupancy; and generate a meet-up recommendation indicating: a particular open meet-up point of the at least one open meet-up point, the user profile, and the at least one similar other user profile; and instruct the user device of the user and the at least one other user device of at least one similar other user to display a graphical user-interface element presenting the meet-up recommendation so as to configure the user device and the at least one other user device to be direction aids when the user selects to a meet-up at the particular open meet-up point with the at least one similar other user.

Systems and/or methods of embodiments of the present disclosure further include where the device signal is a response to a broadcast signal emitted by the at least one IoT device.

Systems and/or methods of embodiments of the present disclosure further include where the at least one profile similarity machine learning model includes a clustering model.

Systems and/or methods of embodiments of the present disclosure further include: determining, by the at least one processor, a prior meet-up point recommendation of a plurality of prior meet-up point recommendations associated with each meet-up point based at least in part on the record of meet-up points at the particular location; and determining, by the at least one processor, the meet-up point occupancy of each meet-up point based at least in part on: a current time, and an end time associated with each prior meet-up point recommendation of the plurality of prior meet-up point recommendations in the record of meet-up points at the particular location.

Systems and/or methods of embodiments of the present disclosure further include: accessing, by the at least one processor, each other user profile associated with each prior meet-up point; determining, by the at least one processor, a travel itinerary associated with each other user profile based at least in part on a travel itinerary attribute stored in each other user profile; and determining, by the at least one processor, the end time associated with each prior meet-up point based at least in part on the travel itinerary associated with each other user profile associated with each prior meet-up point.

Systems and/or methods of embodiments of the present disclosure further include: determining, by the at least one processor, a meet-up start time associated with each prior meet-up point recommendation based at least in part on the record of meet-up points; and determining, by the at least one processor, the end time associated with each prior meet-up point recommendation of the plurality of prior meet-up point recommendations based at least in part on: the meet-up start time and a predetermined meet-up duration threshold associated with each prior meet-up point recommendation of the plurality of prior meet-up point recommendations.

Systems and/or methods of embodiments of the present disclosure further include: determining, by the at least one processor, a particular IoT device of the at least one IoT device associated with a particular meet-up point at the particular location; detecting, by the at least one processor using the particular IoT device, at least one other user device associated with the at least one other user profile; and determining, by the at least one processor, the meet-up point occupancy of the particular meet-up point to be an occupied meet-up point based at least in part on the detecting of the at least one other user device.

Systems and/or methods of embodiments of the present disclosure further include where the particular location includes a travel hub.

Systems and/or methods of embodiments of the present disclosure further include where the travel hub includes at least one of: an airport, a train station, a bus station or a port.

Systems and/or methods of embodiments of the present disclosure further include at least one IoT device embedded within at least one item of furniture in the particular location.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
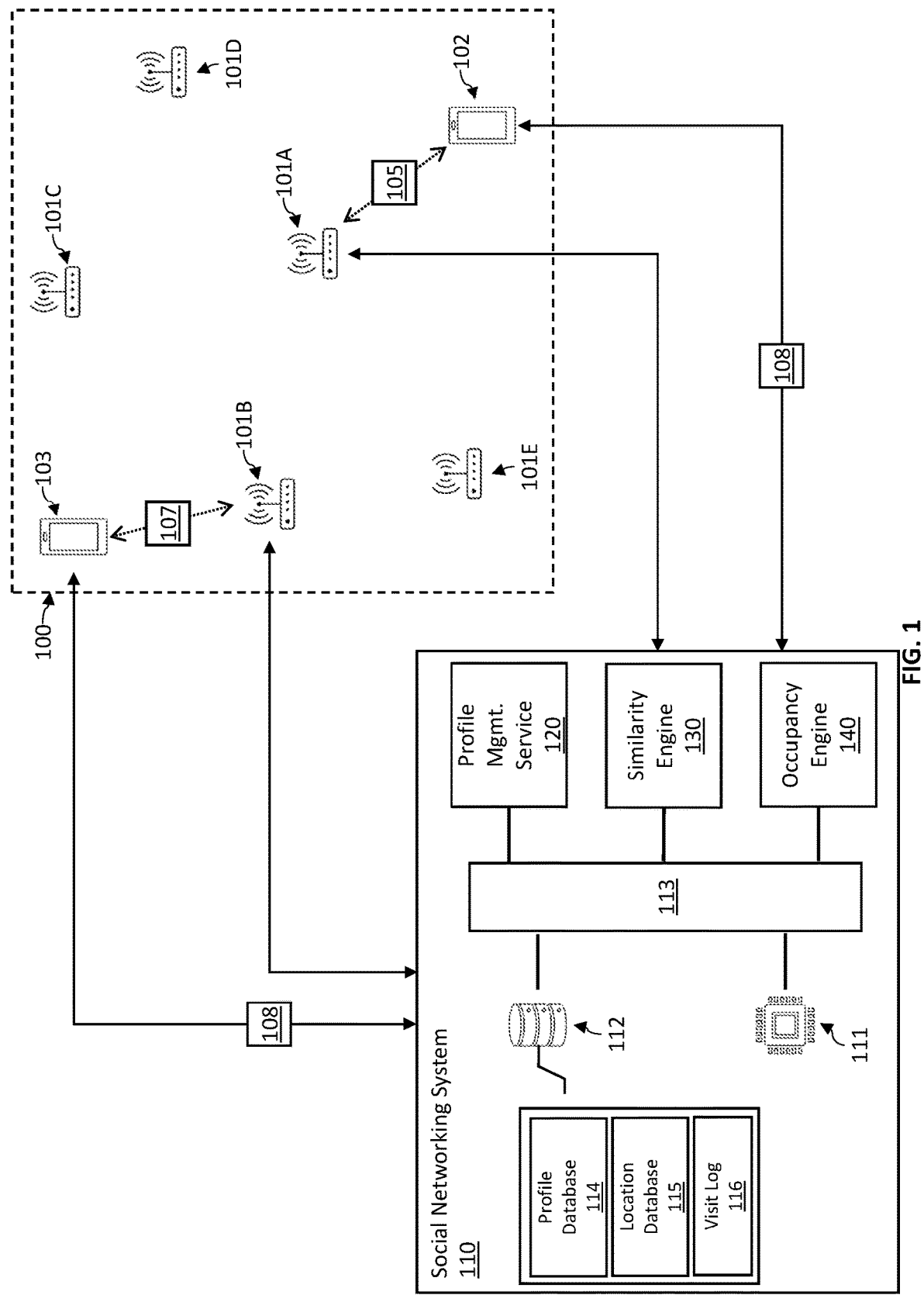
FIG. 1 is a block diagram of an exemplary computer-based system and platform for automated presence detection and social networking recommendations leveraging a network of IoT sensors in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of social networking leveraging a network of IoT devices as predetermined locations. The following embodiments provide technical solutions and technical improvements that overcome technical problems, drawbacks and/or deficiencies in the technical fields involving locating users and identifying similar users, where technical problems include inaccuracy of global positioning system (GPS) locations, inefficiency of constantly monitoring GPS location, among others. As explained in more detail, below, technical solutions and technical improvements herein include aspects of improved detection of the presence of users at a particular location using IoT devices, and improved social network and meet-up recommendations leveraging occupancy tracking of locations via the IoT devices and predictive changes to occupancy and user schedules based on profile attributes. Based on such technical features, further technical benefits become available to users and operators of these systems and methods. Moreover, various practical applications of the disclosed technology are also described, which provide further practical benefits to users and operators that are also new and useful improvements in the art.

Moreover, technical solutions and technical improvements herein further include spatially-based initiation of communication via a specifically configured network of IoT devices. The IoT devices provide a more accurate location system that is less susceptible to errors and interference relative to GPS and radio tower based techniques. Thus, users can quickly and efficiently be put in contact with other users based on accurate location determination according to presence detection.

FIG. 1 is a block diagram of an exemplary computer-based system and platform for automated presence detection and social networking recommendations leveraging a network of IoT sensors in accordance with one or more embodiments of the present disclosure.

Internet-of-Things (IoT) devices placed at physical locations can be used in conjunction with a user's personal internet-connected device (e.g., wearable, smartphone, etc.) to recognize when a user arrives at a particular location. The user can then be matched with other users at the particular location based on similarities in user profiles. Using the IoT devices at the particular location, the user may be directed towards points within the particular location established for meeting the other users with similarities in user profiles, thus enabling the user to engage in in-person interactions with users having similar interests. In some embodiments, the particular location may be a physical space 100 such as, e.g., transportation hubs (e.g., train station, airport, waiting rooms, etc.), community centers, shopping malls, etc.

In some embodiments, IoT devices 101A through 101E can be positioned within a physical space 100. While five IoT devices 101A, 101B, 101C, 101D and 101E are shown here, any number of IoT devices may be employed. In some embodiments, an IoT device 101A-101E may be positioned at each predetermined position within the physical space 100 of a multitude of predetermined positions. For example, the IoT devices 101A-101E may be positioned at each potential meet-up point that is suitable for a meeting of two or more people, such as, e.g., a table, a counter, a bench, a designated area (e.g., designated according to an arrangement of furniture, barriers, markings, or other suitable form of designating an area for a particular purpose), among other meet-up points or any combination thereof.

In some embodiments, each IoT device 101A-101E may be paired, positioned or otherwise associated with a particular position within the physical space 100. By associating the IoT devices 101A-101E with particular positions, the IoT devices 101A-101E may collect position-specific sensor data. The sensor data may include, e.g., detected device signals from nearby devices within range of a particular IoT device 101A-101E, environmental measurements (e.g., weather, temperature, noise level, light intensity, etc.), among other sensor data or any combination thereof.

In some embodiments, the IoT devices 101A-101E may include any suitable internet-connected device for detecting conditions within a proximity of each IoT device 101A-101E. The proximity may include a sensing range of each IoT device 101A-101E according to, e.g., built in radio and/or transceiver and/or receiver sensitivity and power. In some embodiments, the sensing range of each IoT device 101A-101E may be configured to a predetermined range within the capabilities of hardware. The predetermined range may include a position-specific range that is sufficient to encompass an area defining an associated position of each IoT device 101A-101E. For example, the predetermined range may be configured to extend to an area that encompasses an associated table, table with chairs, designated area including any furniture within the designated area, bench, counter, area of a counter, bar top, area of a bar top, or any other suitable area of a potential meet-up point or any combination thereof.

In some embodiments, the predetermined range may be configured according to radio and/or transceiver power limits, filtering based on return signal strength or received signal strength according to signal strength thresholds, or any other suitable technique for associating IoT device 101A-101E sensing/detection range with an area of an associated position for a meet-up point.

In some embodiments, the IoT devices 101A-101E may detect the presence and/or movement of user devices within the proximity of each IoT device 101A-101E. The IoT devices 101A-101E may perform such detections using built-in radios that communicate or otherwise interact with the user devices via, e.g., data communication, electromagnetic field detection, cellular and/or Wifi and/or Bluetooth signal detection, among other techniques for detecting user devices. In some embodiments, the IoT devices 101A-101E may be configured to communicate with each user device via a suitable wireless communication technology. For example, the IoT devices 101A-101E may communicate with user devices via, e.g., Near Field Communication (NFC), radio frequency identification (RFID), ultra-wide band (UWB), Bluetooth, Wifi, or other wireless communication technology or any combination thereof. In some embodiments, the IoT devices 101A-101E may utilize the wireless communication technology to detect the presence of a user device within the predetermined range and/or to exchange data wirelessly with the user device within the predetermined range.

In some embodiments, the IoT devices 101A-101E may provide a network of access points for user devices to communicate with each other and/or with one or more remote services, such as cloud services or other server hosted software (e.g., a webpage, a content delivery network, a messaging service, etc.). Accordingly, the IoT devices 101A-101E may be connected to a computer network such as the internet or an intranet, or a local area network or other computer network. The IoT devices 101A-101E may communicate with one or more remote computing systems, including cloud platforms, servers, databases, mainframes, remote user devices, among other remote computing devices and systems of remote computing devices or any combination thereof.

In some embodiments, the network may include any suitable computer network, including, two or more computers that are connected with one another for the purpose of communicating data electronically. In some embodiments, the network may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more personal computers, printers, and high-capacity disk-storage devices called file servers, which enable each computer on the network to access a common set of files. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet.

In some embodiments, the user device may include any suitable computing device. A computer device may include or be incorporated, partially or entirely into at least one personal computer (PC), laptop computer, ultra-laptop computer, smartphone, tablet, smartwatch, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or any other wirelessly enabled device or any combination thereof including any suitable computer, wearable, etc. In some embodiments, the user device may include a wirelessly enabled device that is not a computing device as described above. Such a wirelessly enabled device may include, e.g., a smart card, Apple AirTag, Samsung SmartTag, Tile device, or any other suitable wireless tracking and/or identification device.

In some embodiments, the user device may include any suitable device including an NFC, RFID and/or UWB radio, including, e.g., passive, active and/or hybrid passive-active radio tags. As a result, an IoT device 101A-101E may detect and communication with a user device upon detection of the radio tag associated with the user device, such as, e.g., the NFC, RFID and/or UWB radio of a smartphone or smartwatch, or the NFC, RFID and/or UWB radio of a tracker device and/or smart card. In some embodiments, the user device may actively broadcast a wireless device signal. One or more of the IoT devices 101A-101E may detect the device signal via an NFC, RFID and/or UWB reader and/or radio. Alternatively or in addition, the IoT devices 101A-101E may broadcast IoT device signals, which the user device may detect and respond to with a return device signal. In some embodiments, the device signal may carry user device data encoded therein. For example, the user device data may include, e.g., a time and/or date associated with the device signal, a user identifier, a user device identifier, a user status (e.g., a user configurable/selectable indication of availability such as "busy", "available", "on the phone", etc.), a user telephone number or other contact information, among other user device data or any combination thereof.

In some embodiments, a first user with a first user device 102 may enter the physical space 100. Upon approaching a first IoT device 101A of the IoT devices 101A-101E in the physical space 100, the first user may enter the predetermined range of the first IoT device 101A. The first IoT device 101A may detect a first device signal 105 associated with the first user device 102, e.g., via a broadcast of the first user device signal 105 and/or a returned first user device signal 105 in response to a broadcast first IoT device 101A signal, or by any other suitable method.

In some embodiments, the first IoT device 101A may receive the first device signal, including first device data encoded therein, and convey the first device data to a social networking system 110. In some embodiments, the first IoT device 101A may decode the first device signal 105 to extract the first device data, and then communicate the first device data, e.g., over a suitable network, to the social network system 110. In some embodiments, the first IoT device 101A may communicate the first device signal 105 to the social networking system 110 without extracting the first device data. Where the first IoT device 101A sends the first device signal 105 to the social networking platform 110, the social network platform 110 may decode the first device signal 105 to extract the first device data.

In some embodiments, rather than the first IoT device 101A sending the first device signal 105 and/or the first device data to the social networking system 110, the first IoT device 101A may return a first instruction to the first user device 102. In some embodiments, the first user device 102 may receive the first instruction, which may be configured to cause the first user device 102 to send the first device data to the social networking system 110.

In some embodiments, the first user device 102 and/or the first IoT device 101A may interact with the social networking system 110 using one or more suitable local and/or network communication protocols, such as, e.g., a messaging protocol, a networking protocol, one or more application programming interfaces (APIs), or other suitable technique for communicating between computing systems or any combination thereof. For example, the first user device 102 and/or the first IoT device 101A may interact with the social networking system 110 over the network including the Internet using the HyperText Transport Protocol (HTTP) to communicate one or more API requests to cause the social networking system 110 to generate a meet-up recommendation 108 based on users present in the physical space 100. In another example, the social networking system 110 is connected to the user device 102 via a local network, such as, e.g., Ethernet, Local Area Network (LAN), wireless LAN (WLAN), WiFi, Bluetooth, or other suitable networking technology or any combination thereof, and communicate via API requests and/or database queries in a suitable database query language (e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages).

In some embodiments, the social networking system 110 may be a part of the user computing device 101. Thus, the social networking system 110 may include hardware and software components including, e.g., user computing device 101 hardware and software, cloud or server hardware and software, or a combination thereof.

In some embodiments, the social networking system 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the social networking system 110 may include datastore 112, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the datastore 112 may include, e.g., a suitable non-transient computer readable medium such as, e.g., random access memory (RAM), read only memory (ROM), one or more buffers and/or caches, among other memory devices or any combination thereof.

In some embodiments, the social networking system 110 may implement computer engines for identifying users based on device signals, determine user attributes based on user profiles, recommend user meet-ups based on the similarity of user attributes between users, and recommend a location within the physical space 100 for each meet-up based on occupancy. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to identify a user and determine user attributes, the social networking system 110 may include computer engines including, e.g., a profile management service 120. In order to implement the profile management service 120, the profile management service 120 may include dedicated and/or shared software components, hardware components, or a combination thereof. For example, the profile management service 120 may include a dedicated processor and storage. However, in some embodiments, the profile management service 120 may share hardware resources, including the processor 111 and datastore 112 of the social networking system 110 via, e.g., a bus 113.

In some embodiments, based on the user attributes, the social networking system 110 may include computer engines including, e.g., a similarity engine 130 to identify other users present in the physical space and determine similar users that may be recommended to meet up with. In order to implement the similarity engine 130, the similarity engine 130 may include dedicated and/or shared software components, hardware components, or a combination thereof. For example, the similarity engine 130 may include a dedicated processor and storage. However, in some embodiments, the similarity engine 130 may share hardware resources, including the processor 111 and datastore 112 of the social networking system 110 via, e.g., a bus 113.

In some embodiments, based on the user attributes, the social networking system 110 may include computer engines including, e.g., an occupancy engine 140 to identify the occupancy of meet-up locations within the physical space in order to recommend a meet-up location. In order to implement the occupancy engine 140, the occupancy engine 140 may include dedicated and/or shared software components, hardware components, or a combination thereof. For example, the occupancy engine 140 may include a dedicated processor and storage. However, in some embodiments, the occupancy engine 140 may share hardware resources, including the processor 111 and datastore 112 of the social networking system 110 via, e.g., a bus 113.

In some embodiments, the social networking system 110 may log the detection of the first user device 102 within the physical area 100 in a visit log 116 within the datastore 112 of the social networking system 110. As a result, the social networking system 110 may use the visit log 116 to identify the first user as present within the physical space 100, and thus eligible for a meet-up recommendation 108 with another user.

In some embodiments, therefore, a second user may enter the physical space 100 with a second user device 103. Upon approaching a second IoT device 101B of the IoT devices 101A-101E in the physical space 100, the second user may enter the predetermined range of the second IoT device 101B. The second IoT device 101B may detect a second device signal 107 associated with the second user device 103, e.g., via a broadcast of the second user device signal 107 and/or a returned second user device signal 107 in response to a broadcast second IoT device 101B signal, or by any other suitable method.

In some embodiments, the second IoT device 101B may receive the second device signal, including second device data encoded therein, and convey the second device data to a social networking system 110. In some embodiments, the second IoT device 101B may decode the second device signal 107 to extract the second device data, and then communicate the second device data, e.g., over a suitable network, to the social network system 110. In some embodiments, the second IoT device 101B may communicate the second device signal 107 to the social networking system 110 without extracting the second device data. Where the second IoT device 101B sends the second device signal 107 to the social networking platform 110, the social network platform 110 may decode the second device signal 107 to extract the second device data.

In some embodiments, rather than the second IoT device 101B sending the second device signal 107 and/or the second device data to the social networking system 110, the second IoT device 101B may return a second instruction to the second user device 103. In some embodiments, the second user device 103 may receive the second instruction, which may be configured to cause the second user device 103 to send the second device data to the social networking system 110.

In some embodiments, the profile management service 120 may receive, e.g., the user identifier and/or the device identifier of the second user device data and access a second user profile, e.g., in a profile database 114 of the datastore 112, associated with the second user. In some embodiments, user profiles in the profile database 114 may include user attributes, such as, e.g.:
   a. Name
   b. Age
   c. Travel bookings (destination, time of departure, connecting flights, rental car, hotel reservation, etc.)
   d. Profession
   e. Job function
   f. Industry
   g. Self-reported mood, status, goal, etc.
   h. Interests
   i. Etc.

In some embodiments, the profile management service 120 may determine additional user attributes for each user profile. For example, the profile management service 120 may use, e.g., transaction histories to determine the travel books, such as inferring an itinerary based on flight ticket purchases, hotel reservation purchases, car rental transactions, among other indicators of a travel. In some embodiments, the physical space 100 may include user-related data including user attributes such as a reservation and/or purchase and/or any other user data associated with the physical space 100. For example, an airport lounge may maintain data of users that are signed up to use the lounge at a particular time, e.g., before an upcoming flight. In some embodiments, the IoT devices 101A-101E may provide the other user data when communicating the user device data and/or user device signal to the social networking system 110.

In some embodiments, the profile management service 120 may identify a set of other user profiles that have also been identified via the one or more IoT devices of the particular location. For example, the profile management service 120 may use the visit log 116 and the profile database 114 to extract the user attributes of other users in the physical space 100 at the time of the second user being in the physical space 100. For example, the profile management service 120 may identify the presence of the first user in the physical space 100 based on the log of the first user device signal and/or first user device data in the visit log 116. The profile management service 120 may then extract the user attributes of the second user from a second user profile associated with the second user in the profile database 114. In some embodiments, the profile management service 120 may extract the user attributes of each user detected to be present in the physical space 100 at the time of the second user being in the physical space.

In some embodiments, the profile management service 120 may use one or more user attributes to determine whether the first user (and any other users) are candidates for a meet-up. In some embodiments, the profile management service 120 may utilize, e.g., the self-reported mood, status and/or goal to determine whether the first user is likely to accept a meet-up recommendation.

Additionally, the profile management service 120 may limit the candidates to user's that are expected to be the physical space 100 for a threshold period of time before leaving. For example, using the travel bookings and/or travel itinerary, the profile management service 120 may determine that the first user has a booking (e.g., a flight, car rental reservation, hotel reservation, event ticket booking, etc.) at a subsequent time relative to the detection of the second user. Where the subsequent time exceeds the threshold period of time after the detection of the second user, the profile management service 120 may identify the first user as a candidate for a meet-up. In some embodiments, the threshold period of time be any suitable time period, such as, e.g., 5 minutes, 10 minutes, 15 minutes, 20 minutes, 25 minutes, 30 minutes, 35 minutes, 40 minutes, 45 minutes, 50 minutes, 55 minutes, an hour or more, or any other threshold period of time within the range of 1 minutes and 100 minutes.

In some embodiments, upon determining that the first user is a candidate for a meet-up with the first user, the similarity engine 130 may utilize the user attributes of each of the first user and the second to determine whether each of the first user and the second user have common or relevant interests with each other. In some embodiments, the similarity engine 130 may utilize the user attributes as inputs to a machine learning model that is trained to assess similarity to formulate a recommendation. Examples of such machine learning models may include, e.g., a clustering model, a neural network (e.g., a convolutional neural network (CNN), a recurrent neural network (RNN) or other deep learning neural network, etc.), collaborative filtering, among other models or any suitable combination thereof.

In some embodiments, the similarity engine 130 may employ a similarity measurement model based on the user attributes of each user. In some embodiments, the similarity measurement model may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, the similarity model 130 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination with any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination with any embodiment described above or below, the exemplary aggregation function may be a mathematical function that combines (e.g., sum, product, etc.) input signals to the node. In some embodiments and, optionally, in combination with any embodiment described above or below, an output of the exemplary aggregation function may be used as input to the exemplary activation function. In some embodiments and, optionally, in combination with any embodiment described above or below, the bias may be a constant value or function that may be used by the aggregation function and/or the activation function to make the node more or less likely to be activated.

In some embodiments, the similarity engine 130 may employ collaborative filtering to recommend similar users. Collaborative filtering is based on the assumption that users who agreed in the past will agree in the future, and that they will like similar other users as they liked in the past. Accordingly, when using collaborative filtering, the similarity engine 130 may generate recommendations for other users with which to meet up using information about rating profiles for different users. The similarity engine 130 may use the rating profile to locate a rating history of another user similar to the current user, and generate recommendations using a cluster around the rating profile. An example of memory-based approaches to collaboratively filter is the user-based algorithm, and an example of model-based collaborative filter is a Kernel-Mapping Recommender.

In some embodiments, by using collaborative filtering, the similarity engine 130 may identify similar uses without relying on machine analyzable content and therefore accurately recommending complex items (e.g., other users) without requiring an "understanding" of the user profile of the other users. Similarity of the rating profiles may include, e.g., the k-nearest neighbor (k-NN) approach and the Pearson Correlation, among others or combinations thereof.

In some embodiments, upon determining that the first user and the second user (among any additional users) are similar and/or recommended for meeting up, the occupancy engine 140 may determine a potential meet-up point that is suitable for a meeting, such as, e.g., a table, a counter, a bench, a designated area (e.g., designated according to an arrangement of furniture, barriers, markings, or other suitable form of designating an area for a particular purpose), among other meet-up points or any combination thereof.

In some embodiments, a number of additional users in addition to the first user and the second user may be added based on additional user profiles associated with the additional users and a maximum and/or minimum number of users configured to a meet-up and/or meet-up type. For example, in some embodiments, the similarity engine 130 may identify one or more user attributes that are similar between the first user, second user and one or more additional users. Thus, the similarity engine 130 may determine a meet-up type based on the one or more user attributes that contribute to the similarity. In some embodiments, the similarity engine 130 may determine the one or more user attributes that contribute to the similarity based on, e.g., user attribute(s) common to each user of the first user, the second user and the one or more additional users, user attribute(s) having a greatest contribution to the similarity measure, or by any other suitable technique or any combination thereof.

In some embodiments, one or more of the first user, the second user and the one or more additional users may select a particular interest associated with the meet-up, either before or after matching via the similarity engine 130. In some embodiments, the similarity engine 130 may filter users according to matching interests for a meet-up. Moreover, the similarity engine 130 may determine the meet-up type based on the matching interests, such as, e.g., a topic, subject, activity, travel destination, professional interest, or other interest or any suitable combination thereof.

In some embodiments, the similarity engine 130 may use the meet-up type to determine maximum and/or minimum group size. In some embodiments, the maximum and minimum group size may be user configurable, preconfigured, automatically determined (e.g., via machine learning and/or statistical analysis and/or logic-based algorithm), or by any other suitable technique or any combination thereof. In some embodiments, the maximum group size may be, e.g., 2, 3, 4, 5, 6, 7, 8, 9, 10 or more users. In some embodiments, the minimum group size may be, e.g., 2, 3, 4, 5, 6, 7, 8, 9, 10 or more users. In some embodiments, where users configured the maximum and minimum group size, e.g., a user attribute in an associated user profile, the similarity engine 130 may use the group size as a parameter for matching, confining the matching process to users having overlapping maximum and minimum group sizes.

In some embodiments, the occupancy engine 140 may access a location database 115 in the datastore 112. In some embodiments, the location database 115 may maintain a catalog of potential meet-up points within the physical area 100. The catalog may include, e.g., details of each potential meet-up point (e.g., size/occupancy limit, amenities, type of furniture, access to food and drink, handicap accessibility, location within the physical area 100, etc.) among any other details or any combination thereof. In some embodiments, the location database 115 may also maintain a log for each potential meet-up point including meet-up recommendations for each potential meet-up point and/or a time period associated with each meet-up recommendation, IoT device 101A-101E data indicating a past or current detect presence at each meet-up point, among other occupancy tracking techniques or any combination thereof. For example, each potential meet-up point may have an IoT device of the IoT devices 101A-101E positioned there such that the IoT device may communicate a real-time presence of user devices such as the first user device 102 and/or the second user device 103 within the area of the potential meet-up point. In some embodiments, for example, the IoT devices 101A-101E may be embedded in furniture and/or decorations (e.g., in a part of a chair, table, counter, bench, lamp, flower pot, coffee table, end table, picture/painting, vase, etc.) or in the flooring, a wall and/or ceiling, or in any other location within the area of the meet-up point.

Accordingly, in some embodiments, the occupancy engine 140 may determine a time period for the meet-up between the first user and the second user. The occupancy engine 140 may utilize the user attributes from each user profile to determine an expected time period during which each user is expected to be present within the physical space 100. In some embodiments, the occupancy engine 140 may determine that the first user and/or the second user has a booking (e.g., a flight, car rental reservation, hotel reservation, event ticket booking, etc.) at a subsequent time relative to the detection of the second user. The occupancy engine 140 may determine an expected end date to the meet-up based on the booking.

In some embodiments, the occupancy engine 140 may compare the expected time period to the occupancy information associated with each meet-up point in the location database 115. In some embodiments, the occupancy engine 140 may identify one or more meet-up points that are not occupied for a greatest portion of the expected time period. In some embodiments, the occupancy engine 140 may generate a list of the meet-up points expected to be not occupied, and rank the list according to the greatest portion of the expected time period for which each meet-up period will be not occupied.

In some embodiments, the occupancy engine 140 may return the highest ranked meet-up point and/or a set of the 2, 3, 4, 5 or more highest ranking meet-up points for use in recommending a meet-up between the first and second users. As a result, in some embodiments, the social networking system 110 may use the recommendation of the first user and the second user to meet-up as generated by the similarity engine 130, and the highest ranked meet-up point(s) to generate a meet-up recommendation 108. In some embodiments, the meet-up recommendation 108 may include meet-up attributes including, e.g., a name and/or picture of each user, a description and/or identifier of a location of the meet-up point(s) within the physical area, among other data related to the meet-up to inform each of the first user and the second user of where, the time for which the meet-up point(s) are not occupied, when and with who to meet-up.

In some embodiments, the social networking system 110 may communicate the meet-up recommendation 108 to each of the first user device 102 and the second user device 103. Each user device may then receive the meet-up recommendation 108, and render the meet-up attributes in a suitable graphical user interface to inform each user of the meet-up details. Each user may accept and/or deny the meet-up via user selection and/or input. Alternatively or in addition, the first user and second user may move to the recommended meet-up point(s), and upon arrival, may communicate with the IoT device 101A-101E at the recommended meet-up point(s) to generate a meet-up confirmation. In some embodiments, the IoT device 101A-101E at the meet-up point that the first user and/or second user chose may detect the presence of the first user device 102 and/or the second user device 103. Upon detection, the IoT device 101A-101E and/or the first user device 102/second user device 103 may communicate the meet-up confirmation to the social networking system 110 to confirm the meet-up recommendation.

In some embodiments, where the first user (for example) shows up to the meet-up point first, the IoT device 101A-101E and/or the first user device 102 may automatically send a message to the second user device 103 to produce an arrival notification. In some embodiments, the arrival notification may cause the second user device 103 to render information including the location of the meet-up point at which the first user is located and/or directions to the meet-up point. In some embodiments, the directions may include direction aids such as an indication of landmarks or features in the physical space, instructions based on a detected location of the user device (e.g., via the IoT devices 101A-101E, a GPS signal, Wifi signal strength, UWB, among other suitable location determinants or any combination thereof), etc. In some embodiments, the arrival notification may be sent directly to the second user device 103, or may be sent to the social networking system 110 which may identify the second user device 103 and forward the arrival notification to the second user device 103.

In some embodiments, upon confirmation of the meet-up recommendation 108, the social networking system 110 may update the visit log 116 and the location database 115 to indicate the meet-up, the end time and/or expected time period of the meet-up and the meet-up point to maintain a real-time log of user presence and meet-up point occupancy.

Figure 2:
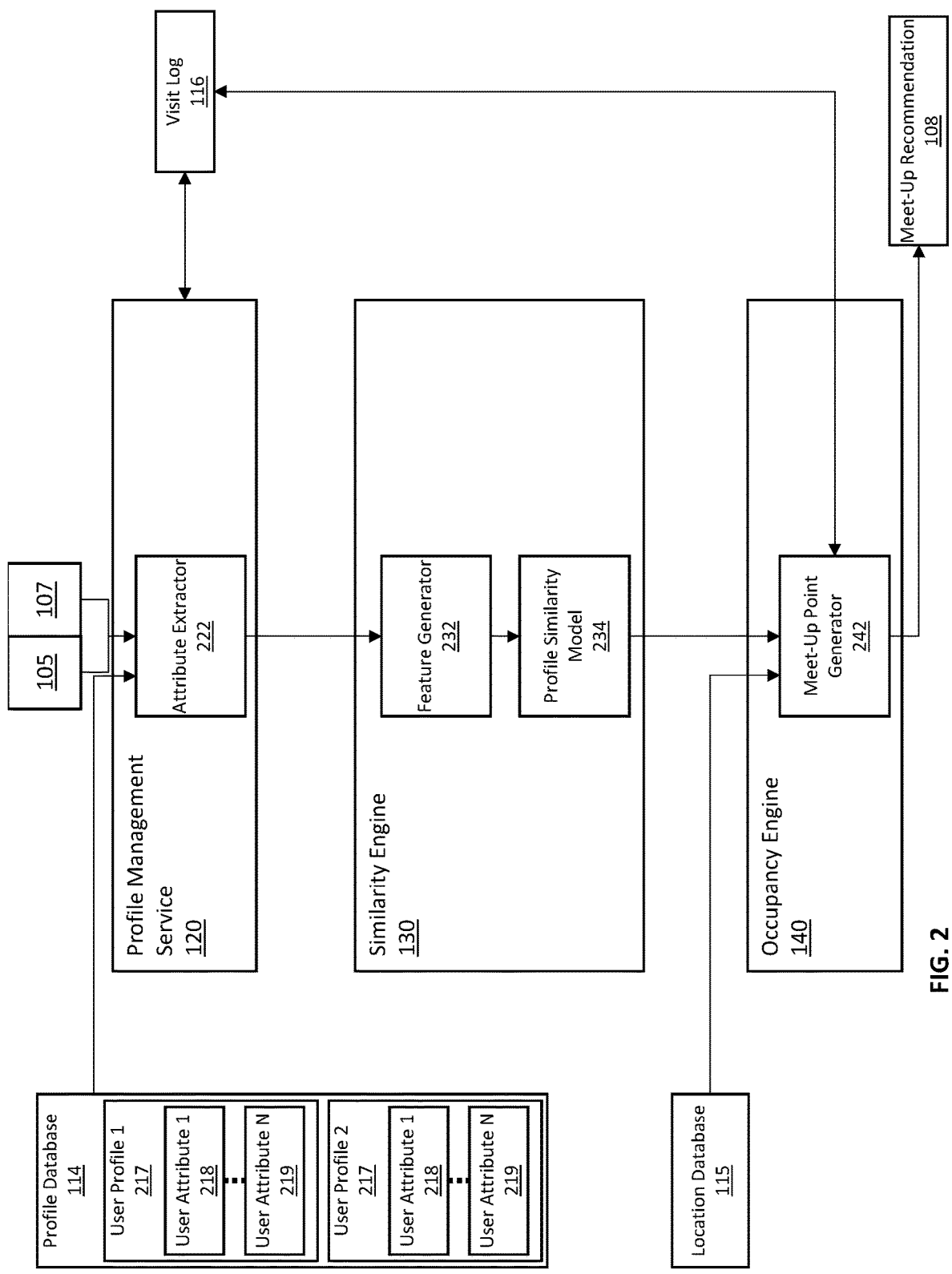
FIG. 2 is a block diagram of a process flow for detecting the presence of a user and automatically recommending a meet-up with another user in accordance with one or more embodiments of the present disclosure.

FIG. 2 is a block diagram of a process flow for detecting the presence of a user and automatically recommending a meet-up with another user in accordance with one or more embodiments of the present disclosure.

In some embodiments, the profile management service 120 may receive the first device signal 105 and the second device signal 107, and/or the first user device data and the second user device data encoded respectively therein. The profile management service 120 may utilize an attribute extractor 222 to obtain the user attributes associated with each of the first user and the second user. Accordingly, the attribute extractor 222 may identify user profiles 217 associated with each of the first user and second user based on the first user device data and the second user device data, respectively.

In some embodiments, each user profile 217 may include user attributes 218 through 219. The user attributes may include, e.g., name, age, travel bookings (destination, time of departure, connecting flights, rental car, hotel reservation, etc.), profession, job function, industry, self-reported information (e.g., mood, status, goal, etc.), interests, etc. The attribute extractor 222 may access and extract the user attributes 218-219 of each user from the user profiles 217 in the profile database 114.

In some embodiments, the profile management service 120 may also interface with the visit log 116 to add each of the first user device data and the second user device data to the visit log 116 to record the presence of each of the first user and the second user. In some embodiments, the profile management service 120 may add the first user device data and the second user device data to the visit log 116 using, e.g., a suitable database query in a database query language, writing to a log for which the profile management service 120 has write permissions, or by any other suitable technique or any combination thereof. In some embodiments, the profile management service 120 may include in the visit log 116 the time associated with each of the first user device data and the second user device data based on the time reported by the IoT device(s) 101A-101E when communicating the first device signal 105 and the second device signal 107.

In some embodiments, the user attributes 218-219 may be communicated to the similarity engine 130 to determine whether the first user and the second user are candidates for a meet-up. In some embodiments, the similarity engine 130 may employ a feature generator 232 to produce one or more feature vectors encoding one or more of the user attributes 218-219. In some embodiments, the user attributes 218-219 may be structured data. Accordingly, the feature generator 232 may generate a vector representation of the user attributes 218-219 for each user. For example, each user attribute 218-219 may be encoded into a numerical form at a predetermined index of the vector. Qualitative attributes, such as, e.g., the profession, job function, industry, interests, etc., may each be mapped to a numerical category in order to produce a quantitative feature for the feature vector. Additionally, quantitative attributes such as date and time, may be converted to an integer form based on a predetermined conversion algorithm. Accordingly, the feature generator 232 may generate a first feature vector associated with the first user and a second feature vector associated with the second user.

In some embodiments, the first and second feature vectors may be provided to a profile similarity model 234. In some embodiments, the profile similarity model 234 may include, e.g., a clustering model, a neural network (e.g., a convolutional neural network (CNN), a recurrent neural network (RNN) or other deep learning neural network, etc.), collaborative filtering, among other models or any suitable combination thereof. In some embodiments, the profile similarity model 234 may ingest both of the first feature vector and the second feature vector to determine a similarity measure.

In some embodiments, the similarity measure may include a similarity score, a match probability, or any other suitable value indicating a degree of similarity between the user attributes of the first user and the user attributes of the second user as encoded in the first and second feature vectors.

In some embodiments, the occupancy engine 140 may use a meet-up point generator 242 to access a location database 115 in the datastore 112. In some embodiments, the meet-up point generator 242 may determine a time period for the meet-up between the first user and the second user. The occupancy engine 140 may utilize the user attributes from each user profile to determine an expected time period during which each user is expected to be present within the physical space 100. In some embodiments, the occupancy engine 140 may determine that the first user and/or the second user has a booking (e.g., a flight, car rental reservation, hotel reservation, event ticket booking, etc.) at a subsequent time relative to the detection of the second user. The occupancy engine 140 may determine an expected end date to the meet-up based on the booking.

In some embodiments, the meet-up point generator 242 may compare the expected time period to the occupancy information associated with each meet-up point in the location database 115. In some embodiments, the meet-up point generator 242 may identify one or more meet-up points that are not occupied for a greatest portion of the expected time period. In some embodiments, the meet-up point generator 242 may generate a list of the meet-up points expected to be not occupied, and rank the list according to the greatest portion of the expected time period for which each meet-up period will be not occupied.

In some embodiments, the meet-up point generator 242 may return the highest ranked meet-up point and/or a set of the 2, 3, 4, 5 or more highest ranking meet-up points for use in recommending a meet-up between the first and second users. As a result, in some embodiments, the meet-up point generator 242 may output the meet-up recommendation 108.

In some embodiments, the meet-up recommendation 108 may include meet-up attributes including, e.g., a name and/or picture of each user, a description and/or identifier of a location of the meet-up point(s) within the physical area, among other data related to the meet-up to inform each of the first user and the second user of where, the time for which the meet-up point(s) are not occupied, when and with who to meet-up.

Figure 3:
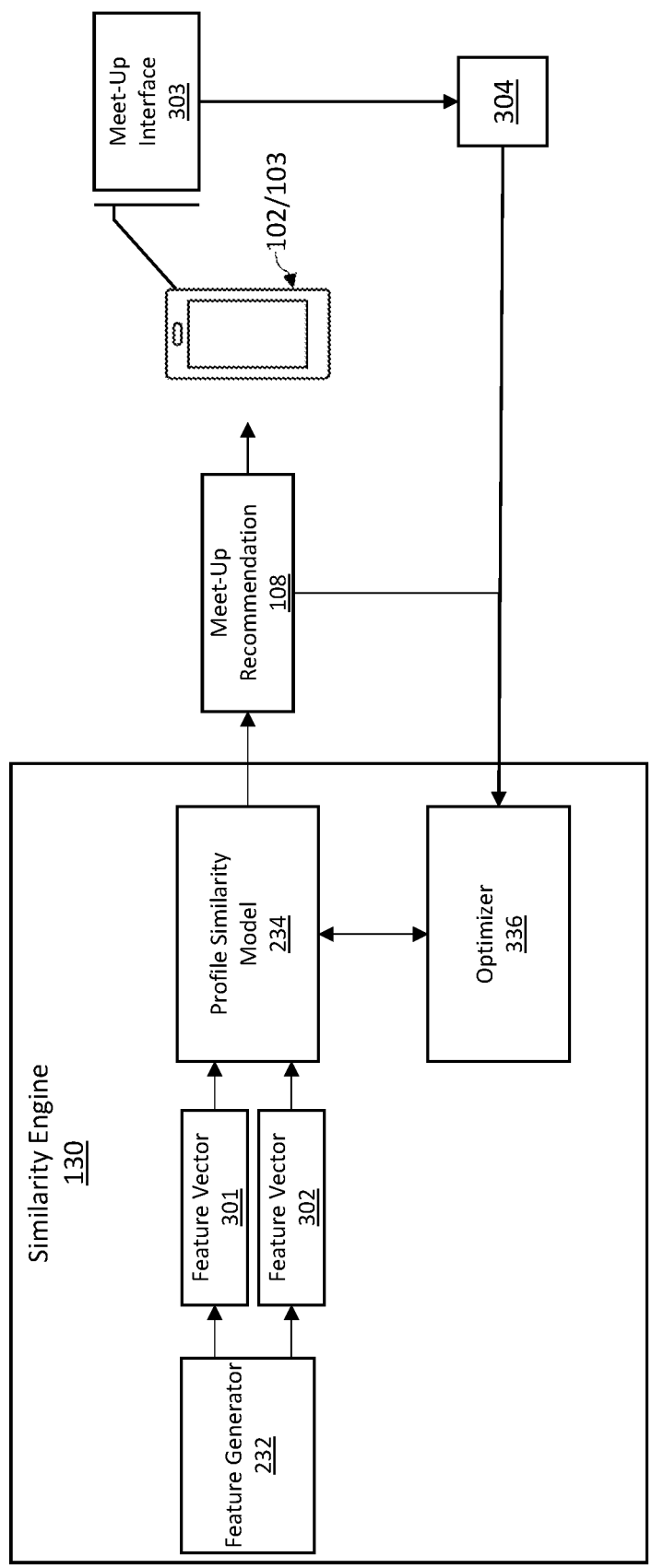
FIG. 3 is a block diagram of a similarity engine for determining user similarity and candidacy for a meet-up in accordance with one or more embodiments of the present disclosure.

FIG. 3 is a block diagram of a similarity engine for determining user similarity and candidacy for a meet-up in accordance with one or more embodiments of the present disclosure.

In some embodiments, the similarity engine 130 may utilize the profile similarity model 234 to predict a meet-up recommendation 108 associated with multiple users. The meet-up recommendation 108 may specify two or more users that have a similarity measure exceeding a similarity threshold and are thus recommended to meet.

In some embodiments, the profile similarity model 234 ingests a first feature vector 301 and second feature vector 302 that encodes features representative of user attributes of the profile of each user. Here, two feature vectors 301 and 302 are depicted for two users, but more than two feature vectors may be employed to concurrently evaluate similarity across a group of users. In addition, or alternatively, each user of the group of users may be compared in a pairwise fashion with each other user based on the associated pair of feature vectors 301 and 302 to determine similarity.

In some embodiments, the profile similarity model 234 processes the first feature vector 301 and second feature vector 302 with model parameters to produces a similarity measure (e.g., a similarity or distance measure, a probability score indicating a probability of a match, or other metric of similarity or any combination thereof). In some embodiments, the parameters of the profile similarity model 234 may be implemented in a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the profile similarity model 234 may advantageously include a random forest classification model.

In some embodiments, the profile similarity model 234 processes the features encoded in the first feature vector 301 and second feature vector 302 by applying the parameters of the classifier machine learning model to produce a model output vector. In some embodiments, the model output vector may be decoded to generate one or more labels indicative of the meet-up recommendation 108. In some embodiments, the model output vector may include or may be decoded to reveal a numerical output, e.g., one or more probability values between 0 and 1 where each probability value indicates a degree of probability that the feature vectors 301 and 302 are a match. In some embodiments, the profile similarity model 234 may test each probability value against a respective probability threshold. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the users are determined to be a match, and thus recommended to meet. For example, the probability threshold can be, e.g., greater than 0.5, greater than 0.6, greater than 0.7, greater than 0.8, greater than 0.9, or other suitable threshold value.

In some embodiments, where the meet-up recommendation 108 includes a classification label of duplicative data entries for the first feature vector 301 and second feature vector 302, the meet-up recommendation 108 may be provided to the user device 102/103 to recommend the users meet. In some embodiments, the meet-up recommendation 108 may trigger the user device 102/103 to generate and display the meet-up interface 303. In some embodiments, the meet-up interface 303 includes a depiction or representation of details of the meeting including a location and/or identity of each user. The user may input a user interaction 304 with an option to confirm the meet-up recommendation 108 or deny the meet-up recommendation 108 or adjust attributes to correct the meet-up recommendation 108. In some embodiments, the user interaction 304 may include a user selection of a confirm option or a deny option relative to the meet-up recommendation 108.

In some embodiments, the user interaction 304 may also include a lack of a selection. For example, the user may choose to ignore the alert of the meet-up interface 303, e.g., by selecting an "ignore" element, or by not providing any selection at all. In some embodiments, where the user ignores the meet-up interface 303, the lack of selection may be interpreted as a command to not take action for the meet-up recommendation 108. Where the meet-up recommendation 108 includes a classification of the sequence of recurring data entries and/or attributes thereof, a command to not take action may represent a confirmation that the meet-up recommendation 108 is correct. Accordingly, the user interaction 304 may include an indication of a confirmation or denial of the meet-up recommendation 108 based on the user's lack of interaction.

In some embodiments, in the case of the lack of any selection, the user interaction 304 may be determined to be an "ignore" interaction after a predetermined period of time has elapsed without any user selection. For example, the optimizer 336 may include a timer that starts upon generation of the meet-up recommendation 108 and ends upon the predetermined time period elapsing. Alternatively, or in addition, the user device 102/103 and/or meet-up interface 303 may include the timer that starts upon receiving the meet-up recommendation 108. In some embodiments, the predetermined period of time may include any suitable time period for user interaction with the meet-up interface 303, such as, e.g., 15 seconds, 30 seconds, 40 seconds, 40 seconds, 45 seconds, 1 minute, 3 minutes, 5 minutes, or any other suitable time period.

In some embodiments, the profile similarity model 234 may be trained based on the meet-up recommendation 108 and the user interaction 304. Based on the difference between the meet-up recommendation 108 and the user interaction 304, the parameters of the classification model of the profile similarity model 234 may be updated to improve the accuracy of the recurring data entry classification.

In some embodiments, training is performed using the optimizer 336. In some embodiments, the meet-up recommendation 108 fed back to the optimizer 336. The optimizer 336 may also ingest the user interaction 304, such as feedback signal 107 from the first user device 102 and/or the second user device 103 described above. In some embodiments, the optimizer 336 may employ a loss function, such as, e.g., Hinge Loss, Multi-class SVM Loss, Cross Entropy Loss, Negative Log Likelihood, or other suitable classification loss function. The loss function determines an error based on the user interaction 304 and the meet-up recommendation 108. In some embodiments, the optimizer 336 may, e.g., backpropagate the error to the profile similarity model 234 to update the parameters using, e.g., gradient descent, heuristic, convergence or other optimization techniques and combinations thereof.

In some embodiments, the optimizer 336 may therefore train the parameters of the profile similarity model 234 to approximate user behaviors in disputing data entries as duplicative based on feedback including the user interaction 304. As a result, the profile similarity model 234 may be continually trained and optimized based on user feedback.

Figure 4:
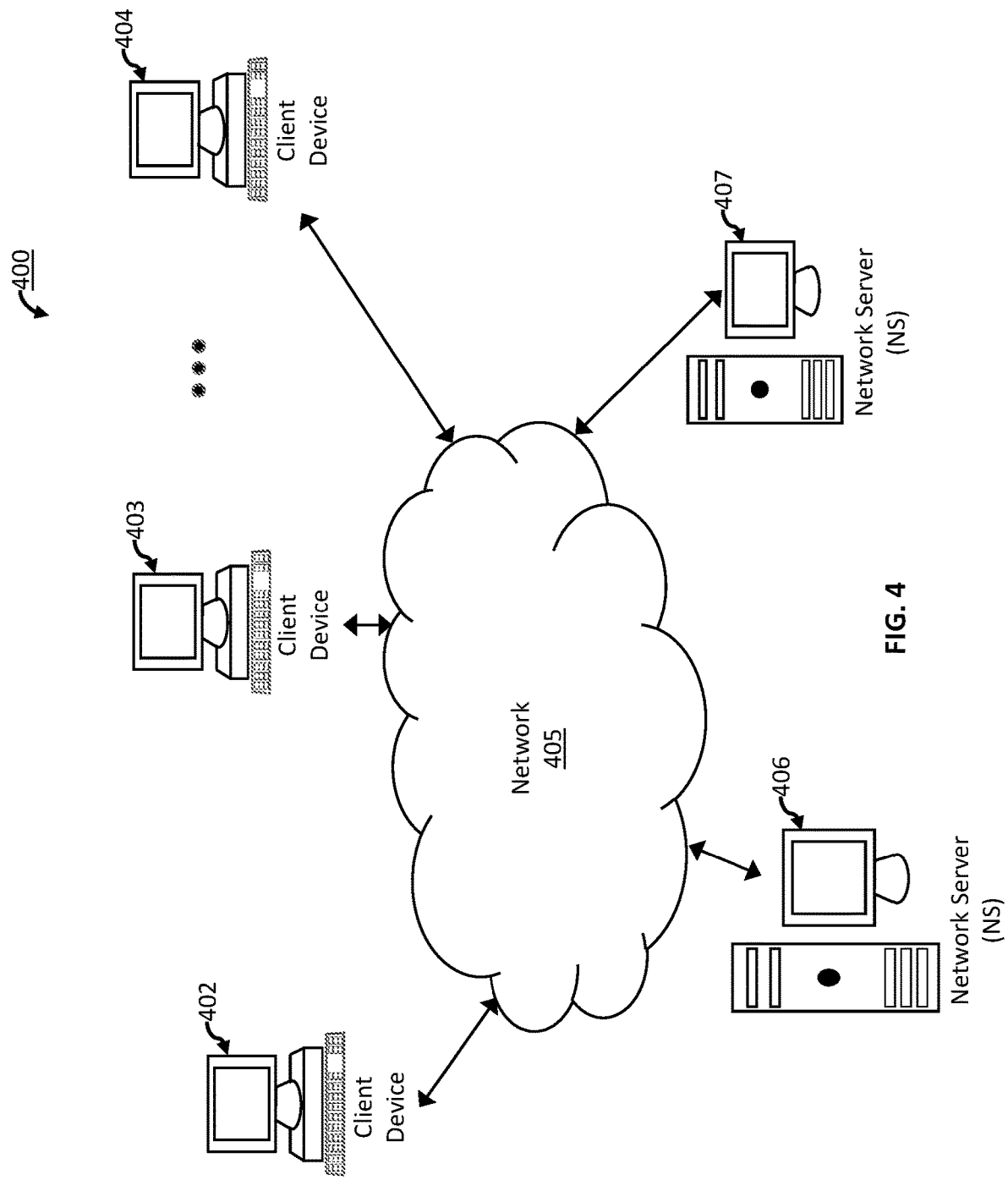
FIG. 4 depicts a block diagram of an exemplary computer-based system and platform for automated presence detection and social networking recommendations leveraging a network of IoT sensors in accordance with one or more embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, "advanced user" or "standard user." In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
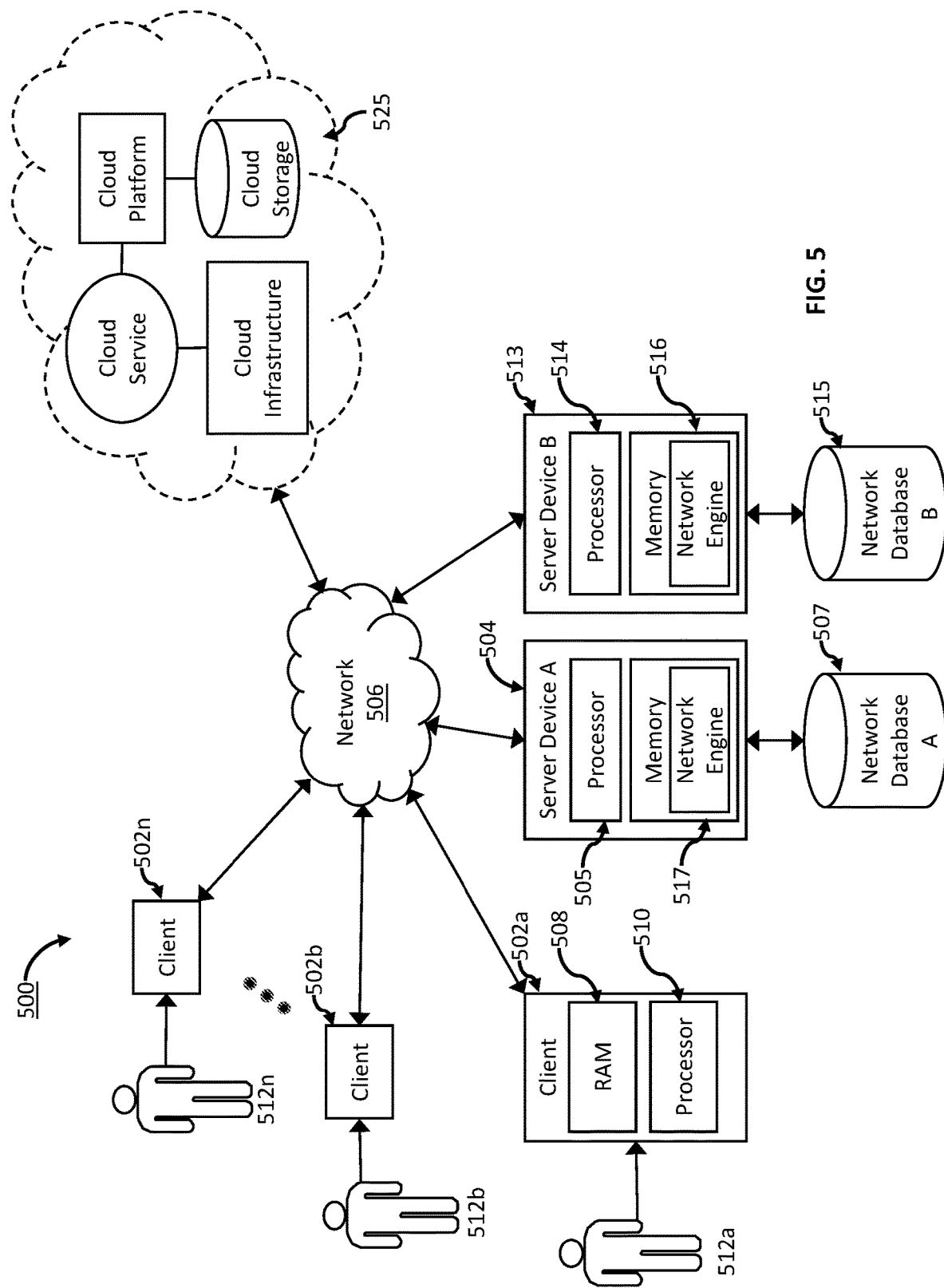
FIG. 5 depicts a block diagram of an exemplary computer-based system and platform for automated presence detection and social networking recommendations leveraging a network of IoT sensors in accordance with one or more embodiments of the present disclosure.

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™, Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, user 512*a*, user 512*b* through user 512*n*, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
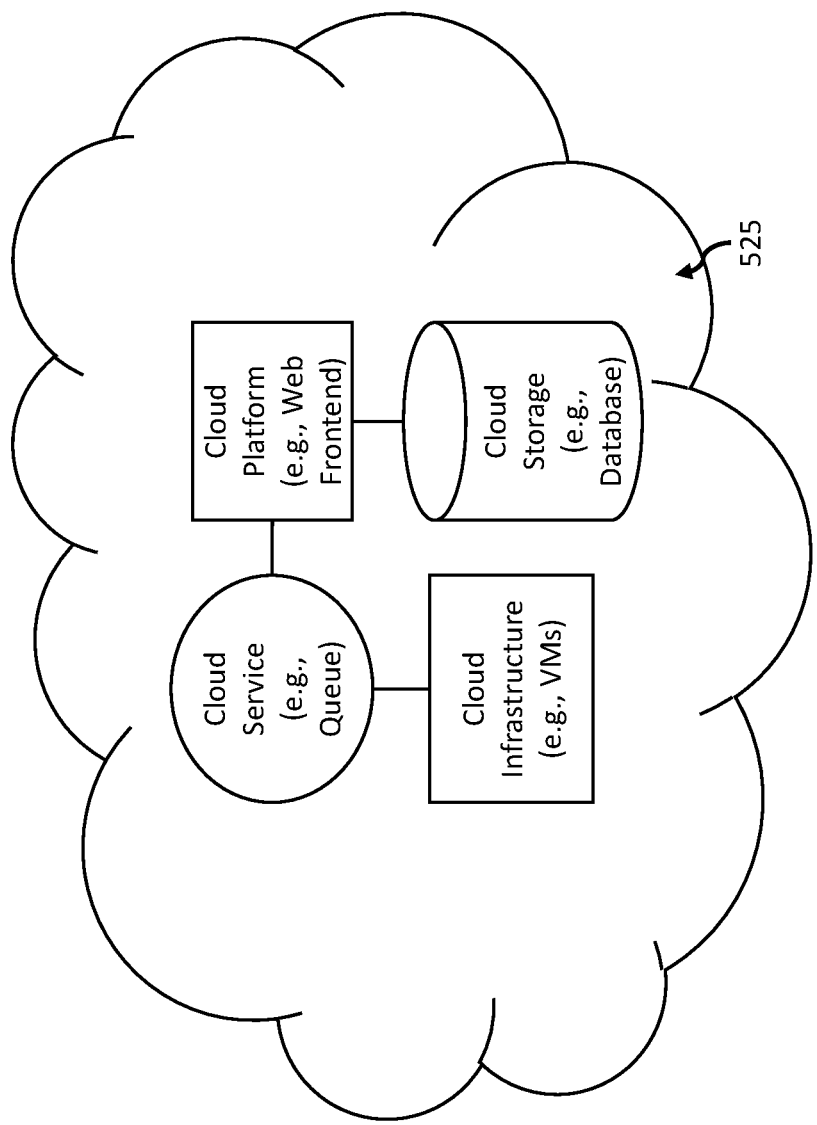
FIG. 6 depicts illustrative schematics of an exemplary implementation of the cloud computing/architecture(s) in which embodiments of a system for automated presence detection and social networking recommendations leveraging a network of IoT sensors may be specifically configured to operate in accordance with some embodiments of the present disclosure.
Figure 7:
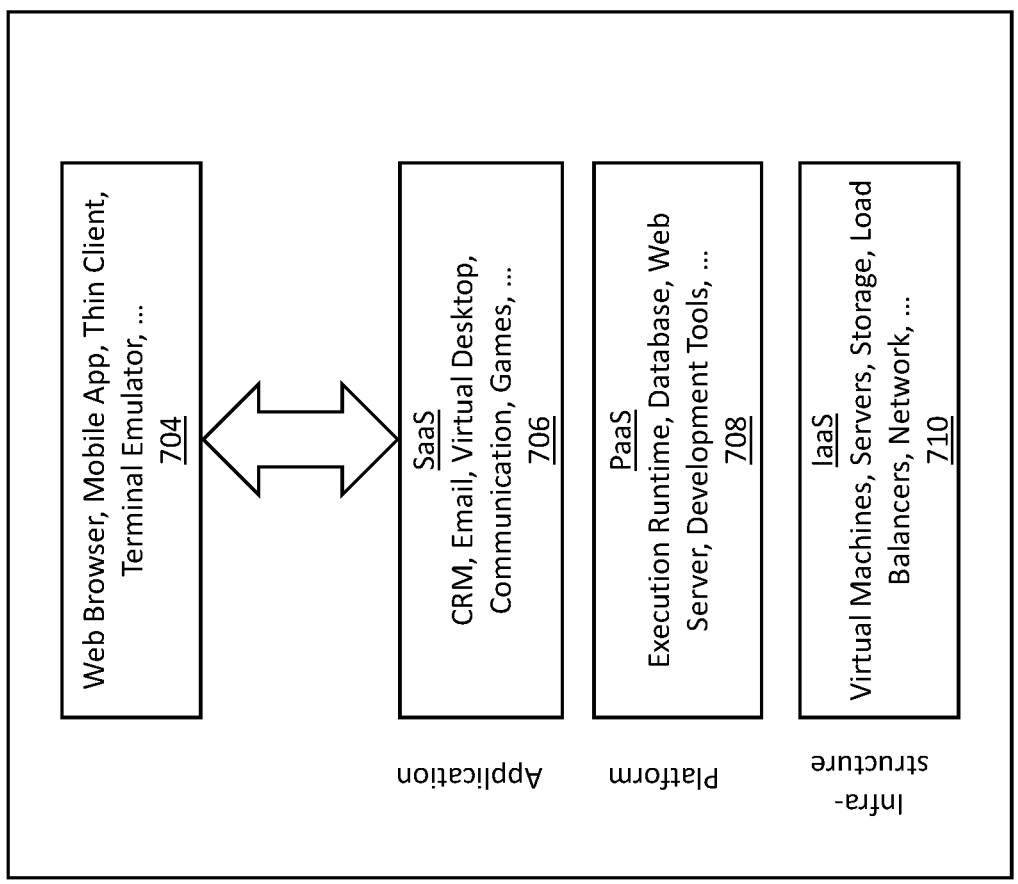
FIG. 7 depicts illustrative schematics of another exemplary implementation of the cloud computing/architecture(s) in which embodiments of a system for automated presence detection and social networking recommendations leveraging a network of IoT sensors may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within a close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method including:
   detecting, by at least one processor for at least one Internet-of-Things (IoT) device associated with a particular location, a device signal associated with a user device of a user;

determining, by the at least one processor, a user profile associated with the user device in response to the device signal;
accessing, by the at least one processor, at least one user attribute stored in the user profile;
determining, by the at least one processor, at least one other user profile associated with at least one other user device detected by the at least one IoT device associated with the particular location;
extracting, by the at least one processor, at least one other user attribute stored in each other user profile of the at least one other user profile;
utilizing, by the at least one processor, a trained profile similarity machine learning model to determine a similarity measure between the user profile and the at least one other user profile based at least in part on:
 the at least one other user attribute stored in each other user profile of the at least one other user profile, and
 the at least one user attribute stored in the user profile;
determining, by the at least one processor, at least one similar other user profile of the at least one other user profile based at least in part on the similarity measure;
determining, by the at least one processor, a meet-up point occupancy of each meet-up point at the particular location based at least in part on a record of the at least one meet-up point;
determining, by the at least one processor, at least one open meet-up point based at least in part on the meet-up point occupancy; and
generating, by the at least one processor, a meet-up recommendation indicating:
 a particular open meet-up point of the at least one open meet-up point, the user profile, and
 the at least one similar other user profile; and
instructing, by the at least one processor, the user device of the user and the at least one other user device of at least one similar other user to display a graphical user-interface element presenting the meet-up recommendation so as to configure the user device and the at least one other user device to be direction aids when the user selects to a meet-up at the particular open meet-up point with the at least one similar other user.

2. A system including:
at least one Internet-of-Things (IoT) device associated with a particular location;
at least one processor in communication with the at least one IoT device, where the at least one processor is configured to execute software instructions that cause the least one processor to perform steps to:
 detect, using the at least one IoT device, a device signal associated with a user device of a user;
 determine a user profile associated with the user device in response to the device signal;
 access at least one user attribute stored in the user profile;
 determine at least one other user profile associated with at least one user device detected by the at least one IoT device associated with the particular location;
 extract at least one other user attribute stored in each other user profile of the at least one other user profile;
 utilize a trained profile similarity machine learning model to determine a similarity measure between the user profile and the at least one other user profile based at least in part on:
  the at least one other user attribute stored in each other user profile of the at least one other user profile, and
  the at least one user attribute stored in the user profile;
 determine at least one similar other user profile of the at least one other user profile based at least in part on the similarity measure;
 determine a meet-up point occupancy of each meet-up point at the particular location based at least in part on a record of the at least one meet-up point;
 determine at least one open meet-up point based at least in part on the meet-up point occupancy; and
 generate a meet-up recommendation indicating:
  a particular open meet-up point of the at least one open meet-up point,
  the user profile, and
  the at least one similar other user profile; and
 instruct the user device of the user and the at least one other user device of at least one similar other user to display a graphical user-interface element presenting the meet-up recommendation so as to configure the user device and the at least one other user device to be direction aids when the user selects to a meet-up at the particular open meet-up point with the at least one similar other user.

3. The method as recited in any of clauses 1 and/or 2, where the device signal is a response to a broadcast signal emitted by the at least one IoT device.

4. The method as recited in any of clauses 1 and/or 2 and/or 3, where the at least one profile similarity machine learning model includes a clustering model.

5. The method as recited in any of clauses 1 and/or 2, further including:
determining, by the at least one processor, a prior meet-up point recommendation of a plurality of prior meet-up point recommendations associated with each meet-up point based at least in part on the record of meet-up points at the particular location; and
determining, by the at least one processor, the meet-up point occupancy of each meet-up point based at least in part on:
 a current time, and
 an end time associated with each prior meet-up point recommendation of the plurality of prior meet-up point recommendations in the record of meet-up points at the particular location.

6. The method as recited in clause 5, further including:
accessing, by the at least one processor, each other user profile associated with each prior meet-up point;
determining, by the at least one processor, a travel itinerary associated with each other user profile based at least in part on a travel itinerary attribute stored in each other user profile; and
determining, by the at least one processor, the end time associated with each prior meet-up point based at least in part on the travel itinerary associated with each other user profile associated with each prior meet-up point.

7. The method as recited in clause 5, further including:
   determining, by the at least one processor, a meet-up start time associated with each prior meet-up point recommendation based at least in part on the record of meet-up points; and
   determining, by the at least one processor, the end time associated with each prior meet-up point recommendation of the plurality of prior meet-up point recommendations based at least in part on:
      the meet-up start time and
      a predetermined meet-up duration threshold associated with each prior meet-up point recommendation of the plurality of prior meet-up point recommendations.
8. The method as recited in any of clauses 1 and/or 2, further including:
   determining, by the at least one processor, a particular IoT device of the at least one IoT device associated with a particular meet-up point at the particular location;
   detecting, by the at least one processor using the particular IoT device, at least one other user device associated with the at least one other user profile; and
   determining, by the at least one processor, the meet-up point occupancy of the particular meet-up point to be an occupied meet-up point based at least in part on the detecting of the at least one other user device.
9. The method as recited in any of clauses 1 and/or 2, where the particular location includes a travel hub.
10. The method as recited in clause 9, where the travel hub includes at least one of:
   an airport,
   a train station,
   a bus station or
   a port.
11. The method as recited in any of clauses 1 and/or 2, where the at least one IoT device is embedded within at least one item of furniture in the particular location.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:
1. A method comprising:
   detecting, by at least one processor for at least one Internet-of-Things (IoT) device associated with a particular location, a device signal associated with a user device associated with a user;
   determining, by the at least one processor, a user profile associated with the user device in response to the device signal;
   accessing, by the at least one processor, at least one user attribute stored in the user profile;
   determining, by the at least one processor, at least one other user profile associated with at least one other user device detected by the at least one IoT device associated with the particular location;
   extracting, by the at least one processor, at least one other user attribute stored in each other user profile of the at least one other user profile;
   utilizing, by the at least one processor, a trained profile similarity machine learning model to determine a similarity measure between the user profile and the at least one other user profile based at least in part on:
      the at least one other user attribute stored in each other user profile of the at least one other user profile, and
      the at least one user attribute stored in the user profile;
   determining, by the at least one processor, at least one similar other user profile of the at least one other user profile based at least in part on the similarity measure;
   determining, by the at least one processor, a meet-up point occupancy of each meet-up point at the particular location based at least in part on a record of the at least one meet-up point;
   determining, by the at least one processor, at least one open meet-up point based at least in part on the meet-up point occupancy; and
   generating, by the at least one processor, a meet-up recommendation indicating:
      a particular open meet-up point of the at least one open meet-up point, the user profile, and
      the at least one similar other user profile; and
   instructing, by the at least one processor, the user device of the user, and the at least one other user device of at least one similar other user, to display a graphical user-interface element presenting the meet-up recommendation so as to configure the user device and the at least one other user device to be direction aids when the user selects to a meet-up at the particular open meet-up point with the at least one similar other user.
2. The method as recited in claim 1, wherein the device signal is a response to a broadcast signal emitted by the at least one IoT device.
3. The method as recited in claim 2, wherein the at least one profile similarity machine learning model comprises a clustering model.
4. The method as recited in claim 1, further comprising:
   determining, by the at least one processor, a prior meet-up point recommendation of a plurality of prior meet-up point recommendations associated with each meet-up point based at least in part on the record of meet-up points at the particular location; and
   determining, by the at least one processor, the meet-up point occupancy of each meet-up point based at least in part on:
      a current time, and
      an end time associated with each prior meet-up point recommendation of the plurality of prior meet-up point recommendations in the record of meet-up points at the particular location.
5. The method as recited in claim 4, further comprising:
   accessing, by the at least one processor, each other user profile associated with each prior meet-up point;
   determining, by the at least one processor, a travel itinerary associated with each other user profile based at least in part on a travel itinerary attribute stored in each other user profile; and
   determining, by the at least one processor, the end time associated with each prior meet-up point based at least in part on the travel itinerary associated with each other user profile associated with each prior meet-up point.
6. The method as recited in claim 4, further comprising:
   determining, by the at least one processor, a meet-up start time associated with each prior meet-up point recommendation based at least in part on the record of meet-up points; and determining, by the at least one processor, the end time associated with each prior meet-up point recommendation of the plurality of prior meet-up point recommendations based at least in part on:
the meet-up start time and
a predetermined meet-up duration threshold associated with each prior meet-up point recommendation of the plurality of prior meet-up point recommendations.

7. The method as recited in claim 1, further comprising:
determining, by the at least one processor, a particular IoT device of the at least one IoT device associated with a particular meet-up point at the particular location;
detecting, by the at least one processor using the particular IoT device, at least one other user device associated with the at least one other user profile; and
determining, by the at least one processor, the meet-up point occupancy of the particular meet-up point to be an occupied meet-up point based at least in part on the detecting of the at least one other user device.

8. The method as recited in claim 1, wherein the particular location comprises a travel hub.

9. The method as recited in claim 8, wherein the travel hub comprises at least one of:
an airport,
a train station,
a bus station or
a port.

10. The method as recited in claim 1, wherein the at least one IoT device is embedded within at least one item of furniture in the particular location.

11. A system comprising:
at least one Internet-of-Things (IoT) device associated with a particular location;
at least one processor in communication with the at least one IoT device, wherein the at least one processor is configured to execute software instructions that cause the least one processor to perform steps to:
detect, using the at least one IoT device, a device signal associated with a user device of a user;
determine a user profile associated with the user device in response to the device signal;
access at least one user attribute stored in the user profile;
determine at least one other user profile associated with at least one user device detected by the at least one IoT device associated with the particular location;
extract at least one other user attribute stored in each other user profile of the at least one other user profile;
utilize a trained profile similarity machine learning model to determine a similarity measure between the user profile and the at least one other user profile based at least in part on:
the at least one other user attribute stored in each other user profile of the at least one other user profile, and
the at least one user attribute stored in the user profile;
determine at least one similar other user profile of the at least one other user profile based at least in part on the similarity measure;
determine a meet-up point occupancy of each meet-up point at the particular location based at least in part on a record of the at least one meet-up point;
determine at least one open meet-up point based at least in part on the meet-up point occupancy; and
generate a meet-up recommendation indicating:
a particular open meet-up point of the at least one open meet-up point,
the user profile, and
the at least one similar other user profile; and
instruct the user device of the user and the at least one other user device of at least one similar other user to display a graphical user-interface element presenting the meet-up recommendation so as to configure the user device and the at least one other user device to be direction aids when the user selects to a meet-up at the particular open meet-up point with the at least one similar other user.

12. The system as recited in claim 11, wherein the device signal is a response to a broadcast signal emitted by the at least one IoT device.

13. The system as recited in claim 12, wherein the at least one profile similarity machine learning model comprises a clustering model.

14. The system as recited in claim 11, wherein the at least one processor is further is configured to execute software instructions that cause the least one processor to perform steps to:
determine a prior meet-up point recommendation of a plurality of prior meet-up point recommendations associated with each meet-up point based at least in part on the record of meet-up points at the particular location; and
determine the meet-up point occupancy of each meet-up point based at least in part on:
a current time, and
an end time associated with each prior meet-up point recommendation of the plurality of prior meet-up point recommendations in the record of meet-up points at the particular location.

15. The system as recited in claim 14, wherein the at least one processor is further is configured to execute software instructions that cause the least one processor to perform steps to:
access each other user profile associated with each prior meet-up point;
determine a travel itinerary associated with each other user profile based at least in part on a travel itinerary attribute stored in each other user profile; and
determine the end time associated with each prior meet-up point based at least in part on the travel itinerary associated with each other user profile associated with each prior meet-up point.

16. The system as recited in claim 14, wherein the at least one processor is further is configured to execute software instructions that cause the least one processor to perform steps to:
determine a meet-up start time associated with each prior meet-up point recommendation based at least in part on the record of meet-up points; and
determine the end time associated with each prior meet-up point recommendation of the plurality of prior meet-up point recommendations based at least in part on:
the meet-up start time and
a predetermined meet-up duration threshold associated with each prior meet-up point recommendation of the plurality of prior meet-up point recommendations.

17. The system as recited in claim 11, wherein the at least one processor is further is configured to execute software instructions that cause the least one processor to perform steps to:

determine a particular IoT device of the at least one IoT device associated with a particular meet-up point at the particular location;

detect, using the particular IoT device, at least one other user device associated with the at least one other user profile; and determine the meet-up point occupancy of the particular meet-up point to be an occupied meet-up point based at least in part on the detecting of the at least one other user device.

18. The system as recited in claim 11, wherein the particular location comprises a travel hub.

19. The system as recited in claim 18, wherein the travel hub comprises at least one of:
an airport,
a train station,
a bus station or
a port.

20. The system as recited in claim 11, wherein the at least one IoT device is embedded within at least one item of furniture in the particular location.

\* \* \* \* \*